(12) United States Patent
Carter et al.

(10) Patent No.: US 8,219,540 B2
(45) Date of Patent: Jul. 10, 2012

(54) INFORMATION VIEWING STEM

(75) Inventors: Heather A. Carter, St. Petersburg, FL (US); Gangadhar Ganga, Clearwater, FL (US); James A. Miller, Dunedin, FL (US)

(73) Assignee: Raytheon Company, Waltham, MA (US)

( * ) Notice: Subject to any disclaimer, the term of this patent is extended or adjusted under 35 U.S.C. 154(b) by 323 days.

(21) Appl. No.: 12/712,852

(22) Filed: Feb. 25, 2010

(65) Prior Publication Data

US 2010/0217784 A1    Aug. 26, 2010

Related U.S. Application Data

(60) Provisional application No. 61/208,767, filed on Feb. 26, 2009.

(51) Int. Cl.
 G06F 17/30    (2006.01)
(52) U.S. Cl. ............. 707/706; 707/694; 707/805
(58) Field of Classification Search .......... 707/694, 707/706, 805; 709/204; 719/328
 See application file for complete search history.

(56) References Cited

U.S. PATENT DOCUMENTS

| | | |
|---|---|---|
| 5,953,718 A | 9/1999 | Wical |
| 7,093,200 B2 | 8/2006 | Schreiber et al. |
| 7,099,885 B2 | 8/2006 | Hellman et al. |
| 7,293,253 B1 | 11/2007 | Soukup |
| 7,293,254 B2 | 11/2007 | Bloesch et al. |
| 7,373,632 B1 | 5/2008 | Kawaguchi et al. |
| 7,428,517 B2 | 9/2008 | Brands et al. |
| 7,467,133 B2 * | 12/2008 | Subramaniam et al. ............ 1/1 |
| 7,505,989 B2 | 3/2009 | Gardner et al. |
| 7,506,334 B2 | 3/2009 | Curtis et al. |
| 7,533,353 B2 * | 5/2009 | Dvorak et al. ............ 715/781 |
| 7,574,689 B2 | 8/2009 | Igelbrink et al. |
| 7,590,606 B1 | 9/2009 | Keller et al. |
| 7,673,282 B2 | 3/2010 | Amaru et al. |
| 8,131,690 B2 * | 3/2012 | Hoile et al. ............ 707/694 |
| 2004/0024739 A1 | 2/2004 | Copperman et al. |
| 2004/0054672 A1 | 3/2004 | Tsuchitani et al. |
| 2004/0117346 A1 | 6/2004 | Stoffel et al. |
| 2004/0230572 A1 | 11/2004 | Omoigui |
| 2005/0108217 A1 | 5/2005 | Werner et al. |
| 2005/0144591 A1 | 6/2005 | Banks |
| 2005/0160080 A1 | 7/2005 | Dawson |
| 2005/0171931 A1 | 8/2005 | Baxter et al. |
| 2006/0288298 A1 * | 12/2006 | Haitani et al. ............ 715/739 |
| 2008/0077598 A1 | 3/2008 | Wilmering et al. |
| 2009/0216748 A1 * | 8/2009 | Kravcik ............ 707/5 |
| 2009/0307580 A1 * | 12/2009 | Dvorak et al. ............ 715/234 |

* cited by examiner

Primary Examiner — Cheryl Lewis
(74) Attorney, Agent, or Firm — Schwegman, Lundberg & Woessner, P.A.; Gregory J. Gorrie

(57) ABSTRACT

According to one embodiment, an information viewing system includes an ontology viewing engine coupled to a client and a knowledge store that stores records organized according to a domain ontology. The ontology viewing engine receives requests for records from the client, filters the domain ontology according to a display ontology, generates a graphical user interface (GUI) according to the display ontology including the requested records, and transmits the GUI to the client through an application programming interface of the GUI.

18 Claims, 3 Drawing Sheets

FIG. 3

INFORMATION VIEWING STEM

RELATED APPLICATIONS

This application claims priority to U.S. Provisional Patent Application Ser. No. 61/208,767, entitled "INFORMATION VIEWING SYSTEM," which was filed on Feb. 26, 2009. U.S. Provisional Patent Application Ser. No. 61/208,767 is hereby incorporated by reference.

TECHNICAL FIELD OF THE DISCLOSURE

This disclosure generally relates to computing storage systems, and more particularly, to an information viewing system that organizes data stored in databases according to an ontological model.

BACKGROUND OF THE DISCLOSURE

Databases organize data records in storage devices such as hard disk drives, tape drives, or other memory components of a computing system. Due to the wide variance in the structure of data, differing type of data models such as relational data models, conceptual data models, or physical data models have been developed to organize data in a specific format. The metadata data model is one particular type that has been implemented for use with various types of web resources and may provide a structure for linking elements of data with one another.

SUMMARY OF THE DISCLOSURE

According to one embodiment, an information viewing system includes an ontology viewing engine coupled to a client and a knowledge store that stores records organized according to a domain ontology. The ontology viewing engine receives requests for records from the client, filters the domain ontology according to a display ontology, generates a graphical user interface (GUI) according to the display ontology including the requested records, and transmits the GUI to the client through an application programming interface of the GUI.

Some embodiments of the disclosure may provide numerous technical advantages. For example, one embodiment of the information viewing system may provide a re-usable platform for viewing differing types of information by any one of a number of differing client applications. The ontological model from which the records are organized may be derived from aspects that may be common to differing types of data. For example, personnel associated with a particular organization may be an interesting aspect of several differing types or organizations. Thus, the ontological model may be applied to differing types of client applications to organize available data associated with each organization into a form that provides efficient use of the data.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 3 is a screenshot showing an example main window representing a graphical user interface (GUI) that may be displayed by the client using the ontology display engine of FIG. 1.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

The resource description framework (RDF) is a specification that applies conceptual modeling techniques to provide a structure for data in which its elements may be linked with one another according to their relationship. Such data structures may provide enhanced utility by improving search capabilities and/or developing a context from which to infer other aspects of information that may not be included in the data while in its raw form.

RDF databases have been developed that store data according to the RDF specification. Access to data from these databases is provided by a RDF query language commonly referred to as the SPARQL query language. In each case, application software written to access data from RDF databases typically includes appropriate software code written according to the SPARQL query language. Data stored in RDF databases, however, is not typically structured in an easily displayable form. Thus, development of differing software applications may require an undesirable duplication of effort to map data structured according to the RDF specification in a presentable, displayable format.

Figure 1:
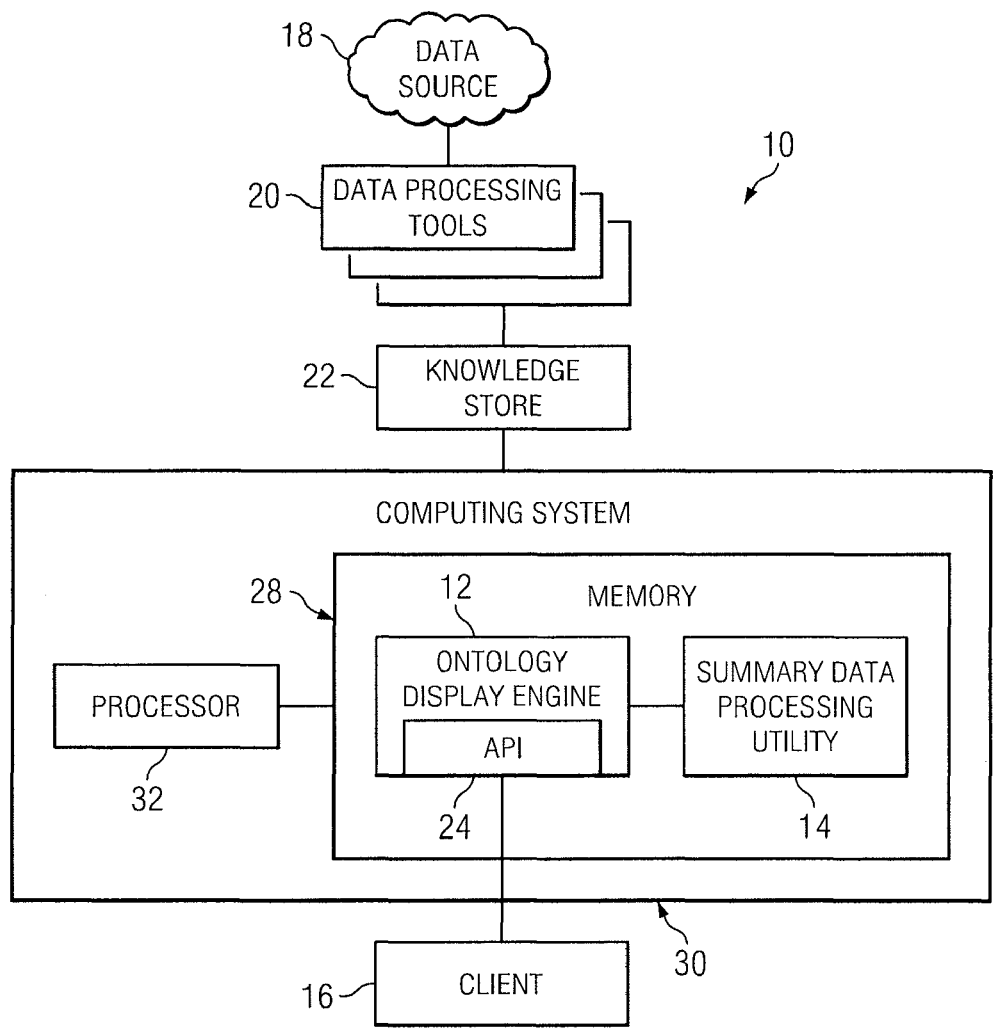
FIG. 1 is a diagram showing one embodiment of an information viewing system according to the teachings of the present disclosure.

FIG. 1 is a diagram showing one embodiment of an information viewing system 10 according to the teachings of the present disclosure. Information viewing system 10 includes an ontology display engine 12, a summary data processing utility 14, a client 16, a data source 18, one or more data processing tools 20, and a knowledge store 22 coupled as shown. Ontology display engine 12 communicates with knowledge store 22 to receive records formatted according to the RDF specification, generate a graphical user interface (GUI) using the received records, and transmit the GUI to client 16 through its applications programming interface (API) 24.

Certain embodiments of information viewing system 10 that generates a GUI comprising a display structure for data formatted according to RDF specifications may provide enhanced benefit over data that is retrieved directly from knowledge store 22. For example, ontology display engine 12 may have a specified ontological structure that provides for re-use by differing types of clients 16. Thus, the development time required for new types of clients 16 may be reduced by using the display structure provided by ontology display engine 12 for presentation of data from knowledge store 22.

Certain embodiments of ontology display engine 12 may also provide enhanced searching capabilities using relevant aspects of the stored data. Although, knowledge store 22 provides data using a linked, structured form, it may not necessarily provide access to the data according to its one or more useful aspects. For example, data associated with a service outlet such as a hospital may be organized in several aspects that may be useful to users such as the number and type of doctors who practice there. Building inspectors, on the other hand, may be relatively more interested in other personnel who may be responsible for the structure and maintenance of the hospital building. The ontology from which the data is organized, therefore, may be structured to accommodate these various aspects of the hospital in a relatively accessible and/or searchable manner.

In one embodiment, information viewing system 10 includes a summary data processing utility 14 that generates summary data about records processed by ontology display engine 12. Summary data may include any type of information about records stored in knowledge store 22. That is, summary data may include any abstracted characteristics of artifacts that may be relevant to a specific ontology. For example, summary data generated by summary data processing utility 14 may include a quantity of artifacts stored in records that fall into a particular category within knowledge store 22.

Data processing tools 20 receive raw data from any one of a number of data sources 18 and structures the data in a linkable form. In one embodiment, data processing tools 20 structure the data in a subject-predicate-object ontological model according to the RDF specification. Data structured according to the subject-predicate-object ontological model may be referred to as triples. As an example, a raw data element comprising "John has a convertible automobile" may be parsed by a data processing tool 20 into a triple including "John" (the subject), "has" (the predicate), and "convertible automobile" (the object).

Any type of data processing tool 20 may be implemented with information viewing system 10. Suitable types of data processing tools 20 include the NETOWL™ software package, available from SRA International Incorporated, the TOPBRAID™ software suite of programming tools available from Topquadrant Incorporated, and/or any custom raw data parsing tool that parses raw data to conform to the RDF specification.

Knowledge store 22 may be any suitable semantic reasoner that links data with one another, and stores the parsed data in a structured, linked format. In a particular embodiment in which data is parsed according to the RDF specification to form triples, knowledge store 22 may link triples according to their common subjects, predicates, or objects. Furthering the example cited above, knowledge store 22 may generate an structured list of artifacts (people) who own convertible automobiles, another structured list of artifacts (possessions) owned by John, and/or even another structured list of artifacts (objects) with which John has an association. Thus, knowledge store 22 provides data in a linked, structured form from which searches may be performed using a particular context to infer other aspects of information about the raw data. In one embodiment, knowledge store 22 comprises an OWLIM™ software package available from Ontotext AD, located in Sofia, Bulgaria.

Client 16 receives the structured, linked data structured in a GUI from ontology display engine 12 and displays it for consumption by a user. In one embodiment, client 16 comprises a user interface that displays the GUI provided by ontology display engine 12. The user interface may include a display, such as a cathode ray tube (CRT) or a liquid crystal display (LCD), and one or more input device, such as a keyboard and/or mouse that provides interaction of the user with ontology display engine 12. In another embodiment, client 16 may comprise another executable application that receives the GUI generated by ontology display engine 12 and performs one or more additional operations on the linked data presented inside. For example, client 16 may comprise a web application that operates as an online retail outlet for certain products in which the web application accesses ontology display engine 12 to display certain aspects of products offered by its website.

Ontology display engine 12 and summary data processing utility 14 is stored in a memory 28 of a suitable computing system 30, and executed by a processor 32 coupled to the memory 28. Computing system 30 may generally be adapted to execute any of the known OS2, UNIX, Mac-OS, Linux, and Windows Operating Systems or other operating systems. Computing system 30 in this embodiment comprises a processor 32 and a memory 28. In other embodiments, computing system 30 may include more, less, or other component parts.

Certain embodiments of ontology display engine 12 and/or summary data processing utility 14 may include logic contained within a medium. Logic may include hardware, software, and/or other logic. Logic may be encoded in one or more tangible media and may perform operations when executed by a computer. Certain logic, such as the processor 32, may manage the operation of the computing system 30. Examples of the processor 32 include one or more microprocessors, one or more applications, and/or other logic. Certain logic may include a computer program, software, computer executable instructions, and/or instructions capable being executed by computing system 30. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as memory 28. Memory 28 may comprise one or more tangible, computer-readable, and/or computer-executable storage medium. Examples of the memory 28 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although the illustrated embodiment provides one embodiment of a computing system that may be used with other embodiments, such other embodiments may additionally utilize computers other than general purpose computers as well as general purpose computers without conventional operating systems. Additionally, embodiments may also employ multiple general purpose computers or other computers networked together in a computer network. For example, multiple general purpose computers or other computers may be networked through the Internet and/or in a client server network. Embodiments may also be used with a combination of separate computer networks each linked together by a private or a public network.

Figure 2:
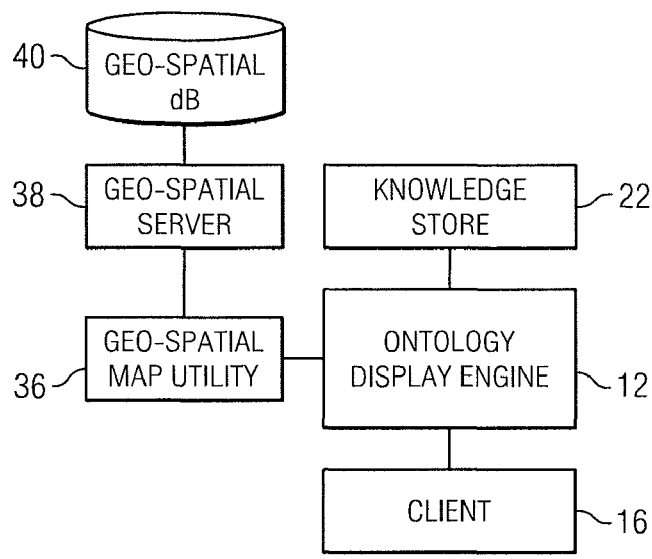
FIG. 2 is a diagram showing one embodiment of the information viewing system of FIG. 1 that incorporates a geospatial mapping utility according to the teachings of present disclosure.

FIG. 2 is a diagram showing one embodiment of the information viewing system 10 of FIG. 1 that incorporates a geospatial map utility 36 according to the teachings of present disclosure. Geo-spatial map utility 36 is coupled to a geo-spatial server 38 and ontology display engine 12 as shown. Geo-spatial map utility 36 receives geo-spatial data from a geo-spatial server 38 that stores data in a geo-spatial database 40. Ontology display engine 12 correlates the structured, linked data from knowledge store 22 with its associated geographical location and presents this information to client 16 on a map generated by geo-spatial map utility 36.

In a particular embodiment, geo-spatial map utility 36 may comprise a GoogleEarth Desktop software package that operates as a thick client, or a GoogleEarth browser plug-in that operates as a thin client and is executable in conjunction with a commonly available web browser, such as a Firefox™, or an Internet Explorer™ web browser. Geo-spatial map utilities 36 such as these may interface with geo-spatial server 38 having a web mapping service (WMS) that receives requests for geo-spatial information and services responses to the requests by accessing the desired geo-spatial information from geo-spatial database 40. In one embodiment, ontology display engine 12 may be implemented as a web application with a web application API that interfaces with geo-spatial map utility 36. With this configuration, information viewing system 10 may be implemented in a distributed fashion over a network using the GoogleEarth Desktop or GoogleEarth browser plug-in that are provided as commercial-off-the-shelf (COTS) products.

Figure 3:
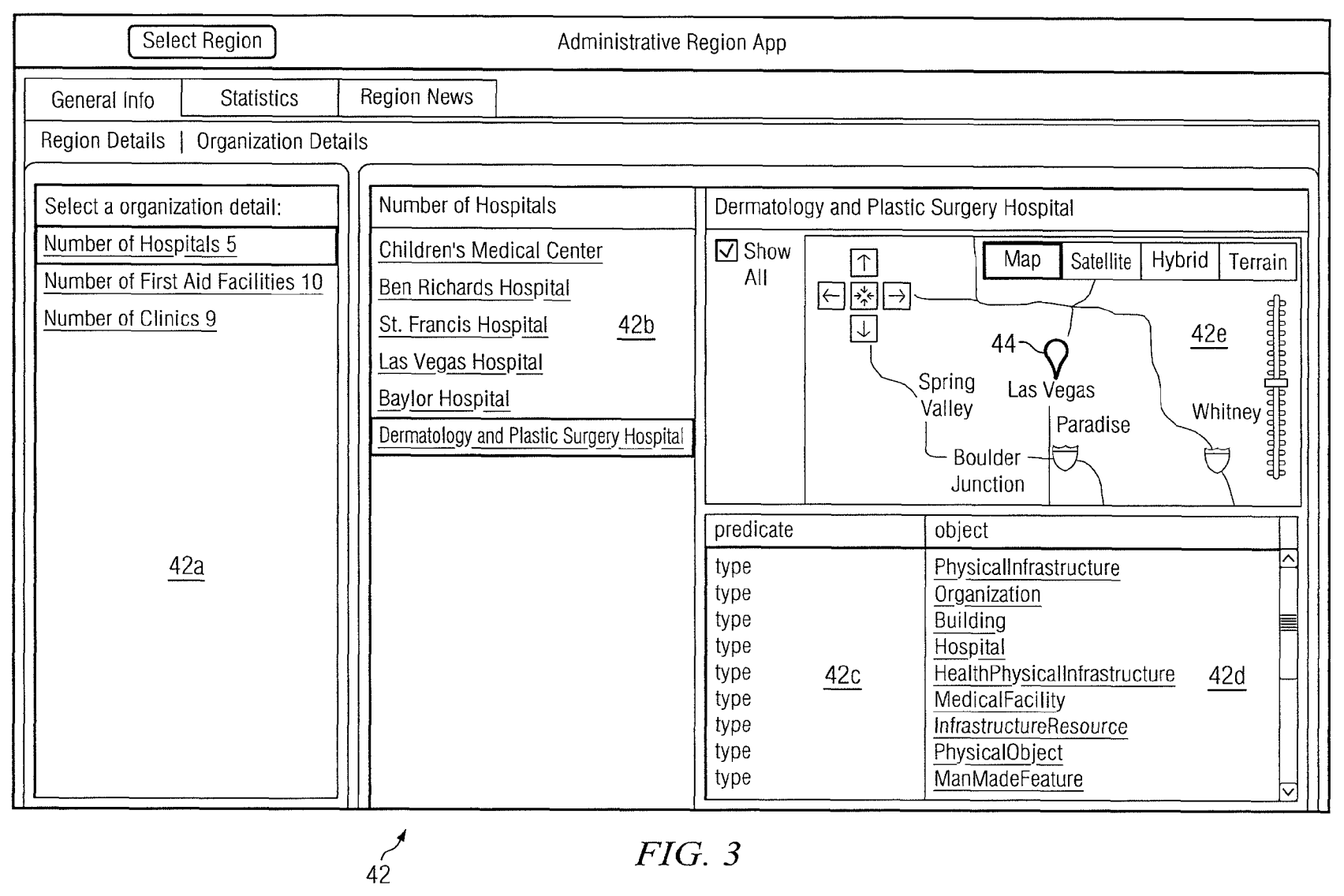

FIG. 3 is a screenshot showing an example main window 42 representing a graphical user interface (GUI) that may be displayed by the client 16 using the ontology display engine 12 of FIG. 1. Main window 42 has a summary data portion 42a, a subject viewing portion 42b, a predicate viewing portion 42c, an object viewing portion 42d, and a map portion 42e arranged as shown. In this particular embodiment, records displayed by main window 42 are organized in a subject-predicate-object ontological model in which the subject portion of records are represented by entries in subject viewing portion 42b, the predicate portion of records are represented by entries in predicate viewing portion 42b, and the object portion of records are represented by entries in object viewing portion 42b. Entries in subject viewing portion 42b may be referred to as primary properties, and entries in object viewing portion 42d may be referred to as secondary properties due to their relationship within the specified ontology.

In one embodiment, primary properties in subject viewing portion 42b and secondary properties in object viewing portion 42d comprise hyperlinks to other records stored in knowledge store 22. Thus, users may access other records related to those displayed in main window 42 to obtain additional information related to information provided by the displayed records. In another embodiment, knowledge store 22 stores each record with a unique uniform resource locator (URI) tag that uniquely identifies its associated record. Thus, records may be associated with one another using their URI tag.

The particular screenshot shown displays records associated with several medical facilities that are located in a particular geographical region. Thus, subject viewing portion 42b may include primary properties including labels representing medical facilities, while object viewing portion 42d may include secondary properties associated with each primary property. Summary portion 42a includes summary information about the primary properties, which in this example, include the quantity of first-aid facilities and the quantity of medical clinics.

Map portion 42e displays a geo-spatial map generated by the geo-spatial map utility 36 of FIG. 2. Ontology display engine 12 generates tags 44 representing the geographical location of primary properties displayed in subject viewing portion 42b. In one embodiment, tags 44 may comprise hyperlinks to additional information about its associate primary property.

Figure 4:
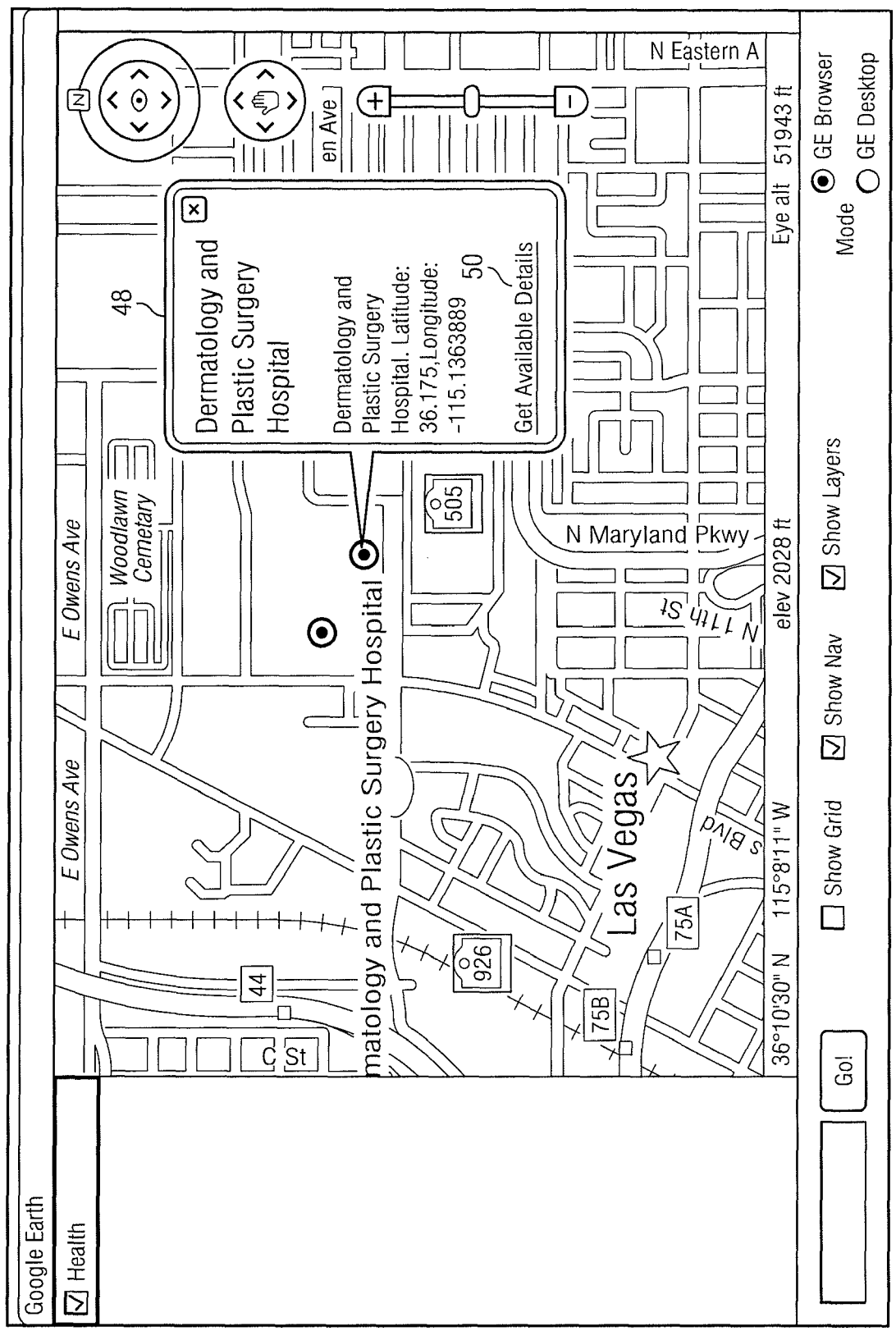
FIG. 4 is another example screenshot showing a map window in which the map displayed in the map portion of main window has been expanded to reveal one of its various feature layers.

FIG. 4 is another example screenshot showing a map window 46 in which the map displayed in the map portion 42e of main window 42 has been expanded to reveal one of its various feature layers. Map window 46 may be accessed from main window 42 in any suitable manner. In one embodiment, map window 46 may be accessed from main window 42 by performing a mouse click operation within map portion 42e of main window 42.

In one embodiment, map window 46 includes an expanded tag 48 that displays additional information associated with its primary property. In another embodiment, expanded tag 48 may display a hyperlink 50 for accessing other records associated with the particular record.

Modifications, additions, or omissions may be made to information viewing system 10 without departing from the scope of the disclosure. The components of information viewing system 10 may be integrated or separated. For example, data source 18 may be a single repository that forms an integral portion of computing system 30, or data source 18 may be a repository external to computing system 30, such as the Internet. Moreover, the operations of information viewing system 10 may be performed by more, fewer, or other components. For example, main window 42 may include other window portions that may enhance view of records, such another window portion that may include metadata associated with each record displayed in subject viewing window portion 42b. Additionally, operations of ontology display engine 12 may be performed using any suitable logic comprising software, hardware, and/or other logic.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. An information viewing system comprising: an ontology display engine stored in a memory and executable on a processor coupled to the memory, the ontology viewing engine operable to communicate with a client through an application programming interface and with an ontology knowledge store that stores a plurality of records structured according to a specified ontology, the ontology display engine operable to: receive a request for one or more of the plurality of records from the client; filter the plurality of records according to a display ontology; generate a graphical user interface (GUI) according to the display ontology including the one or more records; and transmit the GUI to the client through the application programming interface, wherein the GUI includes a geo-spatial map, and wherein the ontology display engine is operable to display, on the map, an icon representing a location associated with the at least one record.

2. An information viewing system comprising: an ontology display engine stored in a memory and executable on a processor coupled to the memory, the ontology viewing engine operable to communicate with a client through an application programming interface and with an ontology knowledge store that stores a plurality of records structured according to a specified ontology, the ontology display engine operable to:

receive a request for one or more of the plurality of records from the client; filter the plurality of records according to a display ontology; generate a graphical user interface (GUI) according to the display ontology including the one or more records; and transmit the GUI to the client through the application programming interface, wherein each record comprises a triple having a subject-predicate-object structure according to a resource description framework (RDF) data model, and wherein the ontology display engine is operable to display a subject, a predicate, or an object of the at least one triple as the hyperlink to the another triple.

3. The information viewing system of claim 2, wherein each of the plurality of triples are uniquely addressable using a uniform resource locator (URI), the hyperlink including the URI.

4. The information viewing system of claim 3, wherein the URI of the at least one triple comprises a root of the URI of the another triple.

5. An information viewing system comprising: an ontology display engine stored in a memory and executable on a processor coupled to the memory, the ontology viewing engine operable to communicate with a client through an application programming interface and with an ontology knowledge store that stores a plurality of records structured according to a specified ontology, the ontology display engine operable to: receive a request for one or more of the plurality of records from the client; filter the plurality of records according to a display ontology; generate a graphical user interface (GUI) according to the display ontology including the one or more records; and transmit the GUI to the client through the application programming interface, wherein the ontology display engine is operable to generate summary data from the one or more records and include the summary data in the GUI.

6. An information viewing system comprising: an ontology display engine stored in a memory and executable on a processor coupled to the memory, the ontology viewing engine operable to communicate with a client through an application programming interface and with an ontology knowledge store that stores a plurality of records structured according to a specified ontology, the ontology display engine operable to: receive a request for one or more of the plurality of records from the client; filter the plurality of records according to a display ontology; generate a graphical user interface (GUI) according to the display ontology including the one or more records; and transmit the GUI to the client through the application programming interface, wherein at least one of the one or more records includes a hyperlink that links the at least one record with another record stored in the knowledge store.

7. An information viewing method comprising: receiving, through an application programming interface of an ontology viewing engine, a request for one or more of a plurality of records from a client, the plurality of records being structured according to a specified ontology; filtering the plurality of records according to a display ontology; generating a graphical user interface (GUI) according to the display ontology including the one or more records, the GUI including a geo-spatial map; transmitting the GUI to the client through the application programming interface; and displaying, on the map, an icon representing a location associated with the at least one record.

8. An information viewing method comprising: receiving, through an application programming interface of an ontology viewing engine, a request for one or more of a plurality of records from a client, the plurality of records being structured according to a specified ontology; filtering the plurality of records according to a display ontology; generating a graphical user interface (GUI) according to the display ontology including the one or more records, each record comprising a triple having a subject-predicate-object structure according to a resource description framework (RDF) data model; transmitting the GUI to the client through the application programming interface; and displaying a subject, a predicate, or an object of the at least one triple as the hyperlink to the another triple.

9. The information viewing method of claim 8, wherein each of the plurality of triples are uniquely addressable using a uniform resource locator (URI), the hyperlink including the URI.

10. The information viewing method of claim 9, wherein the URI of the at least one triple comprises a root of the URI of the another triple.

11. An information viewing method comprising: receiving, through an application programming interface of an ontology viewing engine, a request for one or more of a plurality of records from a client, the plurality of records being structured according to a specified ontology; filtering the plurality of records according to a display ontology; generating a graphical user interface (GUI) according to the display ontology including the one or more records; transmitting the GUI to the client through the application programming interface; and generating summary data from the one or more records and include the summary data in the GUI.

12. An information viewing method comprising: receiving, through an application programming interface of an ontology viewing engine, a request for one or more of a plurality of records from a client, the plurality of records being structured according to a specified ontology; filtering the plurality of records according to a display ontology; generating a graphical user interface (GUI) according to the display ontology including the one or more records, at least one record comprising a hyperlink; transmitting the GUI to the client through the application programming interface; and linking at least one record with another record stored in the knowledge store using the hyperlink.

13. Code implemented on a computer-readable non-transitory medium, when executed by a computer, operable to perform at least the following: receive, through an application programming interface of an ontology viewing engine, a request for one or more of a plurality of records from a client, the plurality of records being structured according to a specified ontology; filter the plurality of records according to a display ontology; generate a graphical user interface (GUI) according to the display ontology including the one or more records, the GUI including a geo-spatial map; transmit the GUI to the client through the application programming interface; and display, on the map, an icon representing a location associated with the at least one record.

14. Code implemented on a computer-readable non-transitory medium, when executed by a computer, operable to perform at least the following: receive, through an application programming interface of an ontology viewing engine, a request for one or more of a plurality of records from a client, the plurality of records being structured according to a specified ontology; filter the plurality of records according to a display ontology; generate a graphical user interface (GUI) according to the display ontology including the one or more records, each record comprising a triple having a subject-predicate-object structure according to a resource description framework (RDF) data model; transmit the GUI to the client through the application programming interface; and display a subject, a predicate, or an object of the at least one triple as the hyperlink to the another triple.

15. The code of claim 14, wherein each of the plurality of triples are uniquely addressable using a uniform resource locator (URI), the hyperlink including the URI.

16. The code of claim 15, wherein the URI of the at least one triple comprises a root of the URI of the another triple.

17. Code implemented on a computer-readable non-transitory medium, when executed by a computer, operable to perform at least the following: receive, through an application programming interface of an ontology viewing engine, a request for one or more of a plurality of records from a client, the plurality of records being structured according to a specified ontology; filter the plurality of records according to a display ontology; generate a graphical user interface (GUI) according to the display ontology including the one or more records; transmit the GUI to the client through the application programming interface; and generate summary data from the one or more records and include the summary data in the GUI.

18. Code implemented on a computer-readable non-transitory medium, when executed by a computer, operable to perform at least the following: receive, through an application programming interface of an ontology viewing engine, a request for one or more of a plurality of records from a client, the plurality of records being structured according to a specified ontology; filter the plurality of records according to a display ontology; generate a graphical user interface (GUI) according to the display ontology including the one or more records, at least one record comprising a hyperlink; transmit the GUI to the client through the application programming interface; and link at least one record with another record stored in the knowledge store using the hyperlink.

* * * * *

UNITED STATES PATENT AND TRADEMARK OFFICE
CERTIFICATE OF CORRECTION

| | |
|---|---|
| PATENT NO. | : 8,219,540 B2 |
| APPLICATION NO. | : 12/712852 |
| DATED | : July 10, 2012 |
| INVENTOR(S) | : Carter et al. |

Page 1 of 1

It is certified that error appears in the above-identified patent and that said Letters Patent is hereby corrected as shown below:

On face page, and in column 1, line 1, Item 54 delete "STEM" and insert --SYSTEM--, therefor In sheet 3 of 3, fig. 4, line 3, delete "Cemetary" and insert --Cemetery--, therefor In column 3, line 54, delete "an" and insert --a--, therefor In column 5, line 19, delete "responses" and insert --response--, therefor In column 5, line 34, delete "42d," and insert --42d--, therefor In column 5, line 54, delete "locator" and insert --identifier--, therefor In column 7, line 14, in claim 3, delete "locator" and insert --identifier--, therefor In column 8, line 10 (approx), in claim 9, delete "locator" and insert --identifier--, therefor In column 15, line 3, in claim 15, delete "locator" and insert --identifier--, therefor Signed and Sealed this
Eighteenth Day of September, 2012

David J. Kappos
*Director of the United States Patent and Trademark Office*